United States Patent
Sawada

(10) Patent No.: US 8,564,860 B2
(45) Date of Patent: Oct. 22, 2013

(54) IMAGE PROCESSOR FOR CORRECTING IMAGE DATA

(75) Inventor: Kazuhide Sawada, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 575 days.

(21) Appl. No.: 12/696,705

(22) Filed: Jan. 29, 2010

(65) Prior Publication Data

US 2010/0195172 A1  Aug. 5, 2010

(30) Foreign Application Priority Data

Jan. 30, 2009  (JP) .................. 2009-019835

(51) Int. Cl.
| | |
|---|---|
| H04N 1/46 | (2006.01) |
| H04N 1/40 | (2006.01) |
| H04N 7/01 | (2006.01) |
| H04N 9/73 | (2006.01) |
| H04N 5/262 | (2006.01) |
| H04N 5/76 | (2006.01) |
| G06F 15/00 | (2006.01) |
| G09G 3/20 | (2006.01) |
| G09G 5/00 | (2006.01) |
| G09G 5/02 | (2006.01) |
| G03G 15/00 | (2006.01) |

(52) U.S. Cl.
USPC ............ 358/516; 358/448; 358/504; 358/1.9; 358/500; 348/448; 348/239; 348/223.1; 348/655; 348/231.99; 345/581; 345/590; 345/594; 345/74.1; 399/49

(58) Field of Classification Search
USPC .......... 358/516, 504, 1.9, 500; 348/448, 239, 348/223.1; 345/593, 590, 74.1; 399/49
See application file for complete search history.

(56) References Cited

U.S. PATENT DOCUMENTS

| | | | |
|---|---|---|---|
| 5,442,408 A | 8/1995 | Haruki | |
| 5,739,809 A * | 4/1998 | McLaughlin et al. | ........ 345/594 |

(Continued)

FOREIGN PATENT DOCUMENTS

| | | |
|---|---|---|
| JP | H03-250992 A | 11/1991 |
| JP | H03-274884 A | 12/1991 |

(Continued)

OTHER PUBLICATIONS

Japan Patent Office; Office Action for Patent Application No. 2009-019833, mailed Nov. 9, 2010. (counterpart to above-captioned U.S. patent application).

(Continued)

*Primary Examiner* — Charlotte M Baker
*Assistant Examiner* — Rury Grisham
(74) *Attorney, Agent, or Firm* — Baker Botts L.L.P.

(57) ABSTRACT

An image processor includes an identifying unit, a first correcting unit, and a second correcting unit. The identifying unit identifies a white point value of an image represented by first image data. The white point value indicates a first color temperature. The first correcting unit performs a white balance correction on the first image data such that the white point value approaches a target white point value. The target white point value indicates a second color temperature. The second correcting unit performs a brightness correction for correcting the first image data corrected by the first correcting unit into second image data such that an image corresponding to the second image data is brighter as the second color temperature is higher than the first color temperature and such that the image corresponding to the second image data is darker as the second color temperature is lower than the first color temperature.

6 Claims, 6 Drawing Sheets

(56) References Cited

U.S. PATENT DOCUMENTS

| | | |
|---|---|---|
| 5,956,015 A | 9/1999 | Hino |
| 6,505,002 B2 | 1/2003 | Fields |
| 6,614,555 B1 | 9/2003 | Hidaka |
| 6,847,374 B2 | 1/2005 | Matsuda |
| 6,859,551 B2 | 2/2005 | Ohga |
| 6,947,079 B2 | 9/2005 | Parulski et al. |
| 6,987,586 B2 | 1/2006 | Bogdanowicz et al. |
| 7,126,610 B2 | 10/2006 | Hammond |
| 7,595,811 B2 | 9/2009 | Matsuda |
| 2002/0015043 A1 | 2/2002 | Matsuda |
| 2002/0044685 A1 | 4/2002 | Takahashi |
| 2003/0020725 A1 | 1/2003 | Matsuda |
| 2003/0090750 A1 | 5/2003 | Takahashi |
| 2003/0142377 A1 | 7/2003 | Yamada et al. |
| 2004/0085459 A1 | 5/2004 | Hoshuyama et al. |
| 2005/0149864 A1 | 7/2005 | Matsuzaki et al. |
| 2006/0187321 A1* | 8/2006 | Sakamoto ............... 348/239 |
| 2008/0129678 A1 | 6/2008 | Choi et al. |
| 2008/0137114 A1 | 6/2008 | Sanami |
| 2008/0303922 A1 | 12/2008 | Chaudhri et al. |
| 2009/0021526 A1 | 1/2009 | Chiang et al. |
| 2009/0195670 A1 | 8/2009 | Koishi |
| 2010/0165137 A1 | 7/2010 | Koishi |
| 2010/0195127 A1 | 8/2010 | Sawada |
| 2010/0195907 A1 | 8/2010 | Sawada |

FOREIGN PATENT DOCUMENTS

| | | |
|---|---|---|
| JP | H11-004353 A | 1/1999 |
| JP | 2001-171186 A | 6/2001 |
| JP | 2002-152772 A | 5/2002 |
| JP | 2003-209855 A | 7/2003 |
| JP | 2003-209856 A | 7/2003 |
| JP | 2003-219176 A | 7/2003 |
| JP | 2003-234955 A | 8/2003 |
| JP | 2006-050424 A | 2/2006 |
| JP | 2006-173825 A | 6/2006 |
| JP | 2006-304316 A | 11/2006 |
| JP | 2007-265818 A | 10/2007 |
| JP | 2008-146228 A | 6/2008 |
| WO | 2008/050761 A1 | 5/2008 |

OTHER PUBLICATIONS

Japan Patent Office; Office Action for Patent Application No. 2009-019835, mailed Jan. 11, 2011 (counterpart to above-captioned U.S. patent application).

Japan Patent Office; Office Action for Patent Application No. 2009-019834, mailed Nov. 9, 2010. (counterpart to above-captioned U.S. patent application).

* cited by examiner

IMAGE PROCESSOR FOR CORRECTING IMAGE DATA

CROSS REFERENCE TO RELATED APPLICATION

This application claims priority from Japanese Patent Application No. 2009-019835 filed Jan. 30, 2009. The entire content of the priority application is incorporated herein by reference.

TECHNICAL FIELD

The present invention relates to an image processor, a computer-readable storage medium storing a computer-executable image-processing program, and an image processing method for correcting image data used to render a printed image so that the colors in the printed image under a reference ambient light are reproduced under ambient light present where the printed image will be viewed.

BACKGROUND

Various studies have been conducted on how different ambient lights (artificial and natural lights) affect humans differently. This effect, often called the Kruithof effect, indicates the psychological effect that ambient light has on humans. As shown in the graph of FIG. 6, light with a low color temperature is not pleasing to humans at high intensities, but is pleasing at low intensities. On the other hand, light with a high color temperature is not pleasing to humans at low intensities, but is pleasing at high intensities. Thus, the range of light intensities considered to provide pleasing illumination differs according to the color temperature of the ambient light. In FIG. 6, "A" indicates an incandescent lighting, "B" indicates a fluorescent lighting (warm white), "C" indicates a fluorescent lighting (white), "D" indicates a fluorescent lighting (cool white), and "E" indicates a fluorescent lighting (daylight).

Some conventional lighting fixtures have accounted for this Kruithof effect. For example, one such lighting fixture can emit light in a plurality of white colors, such as daylight, cool white, white, warm white, and extra warm white through a combination of blue LEDs having a high color temperature and yellow LEDs having a low color temperature. The lighting fixture produces the different white colors by adjusting the light intensity produced by the blue LEDs while keeping the intensity of the yellow LEDs fixed. Hence, the light intensity of the lighting fixture increases when the intensity of the blue LEDs increases (i.e., when the color temperature rises).

SUMMARY

White balance correction is a process well known in the art for estimating the lighting conditions when an image was captured and adjusting the white point accordingly in order to remove color cast on an image that was captured under lighting having color without adjusting the white point.

However, while studies have been conducted on matching white points in color reproduction, studies have not yet been conducted on correcting an image based on the white point color so that the appearance of the image is favorable.

In view of the foregoing, it is an object of the present invention to provide an image processor, a computer-readable storage medium storing a computer-executable image-processing program, and an image-processing method capable of producing an image with a favorable appearance after correcting white balance.

In order to attain the above and other objects, there is provided an image processor including an identifying unit, a first correcting unit, and a second correcting unit. The identifying unit identifies a white point value of an image represented by first image data. The white point value indicates a first color temperature. The first correcting unit performs a white balance correction on the first image data such that the white point value approaches a target white point value. The target white point value indicates a second color temperature. The second correcting unit performs a brightness correction for correcting the first image data corrected by the first correcting unit into second image data such that an image corresponding to the second image data is brighter as the second color temperature is higher than the first color temperature and such that the image corresponding to the second image data is darker as the second color temperature is lower than the first color temperature.

According to another aspect of the present invention, there is provided a computer-readable storage medium storing a computer-executable image-processing program executable on an image-processor, the image-processing program including:

instructions for identifying a white point value of an image represented by first image data, the white point value indicating a first color temperature;

instructions for performing a white balance correction on the first image data such that the white point value approaches a target white point value, the target white point value indicating a second color temperature;

instructions for correcting the first image data corrected by the first correcting unit into second image data such that an image corresponding to the second image data is brighter as the second color temperature is higher than the first color temperature and such that the image corresponding to the second image data is darker as the second color temperature is lower than the first color temperature.

According to another aspect of the present invention, there is provided an image-processing method including:

identifying a white point value of an image represented by first image data, the white point value indicating a first color temperature;

performing a white balance correction on the first image data such that the white point value approaches a target white point value, the target white point value indicating a second color temperature;

correcting the first image data corrected by the first correcting unit into second image data such that an image corresponding to the second image data is brighter as the second color temperature is higher than the first color temperature and such that the image corresponding to the second image data is darker as the second color temperature is lower than the first color temperature.

DETAILED DESCRIPTION

Next, a preferred embodiment of the present invention will be described while referring to the accompanying drawings.

1. Overall Structure of Communication System

Figure 1:
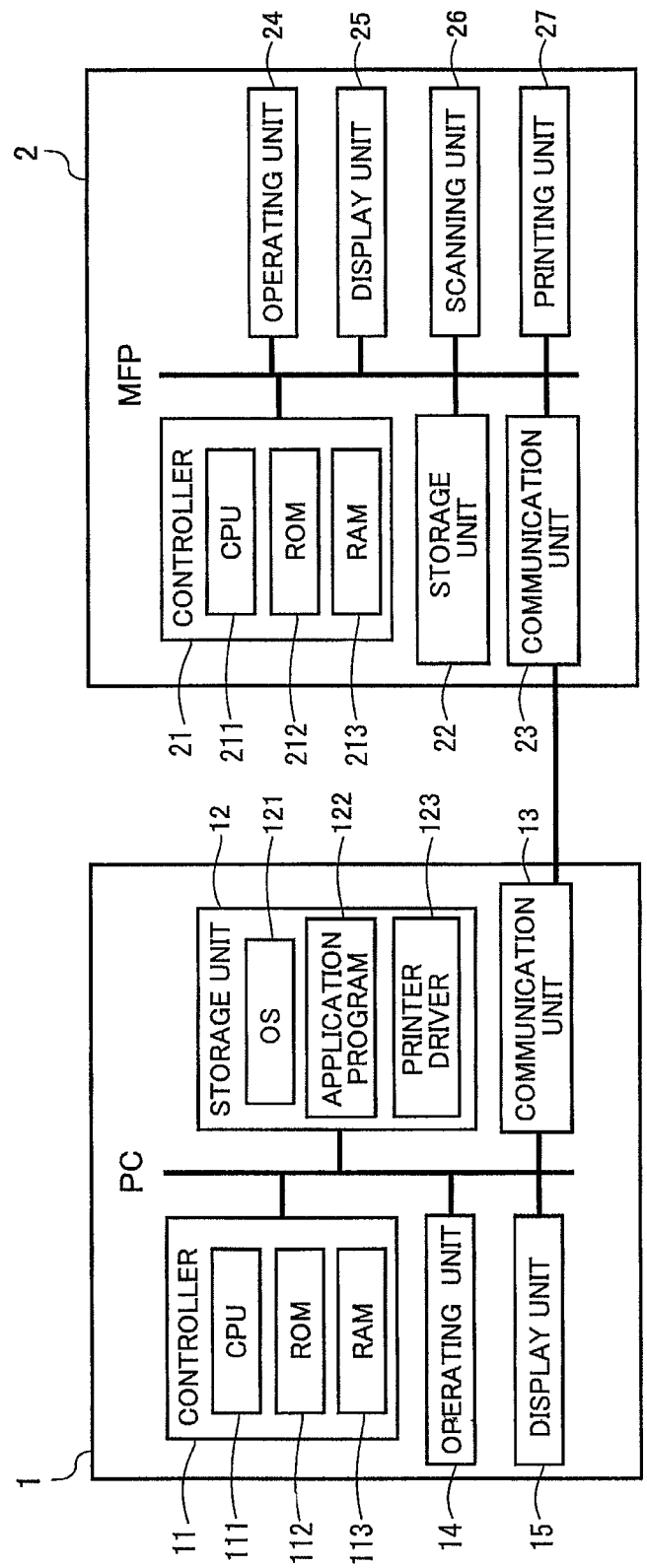
FIG. 1 is a block diagram showing a general structure of a communication system according to an embodiment of the present invention.

FIG. 1 is a block diagram showing the general structure of a communication system including a personal computer (PC) 1, and a multifunction peripheral (MFP) 2 that are capable of performing data communications with each other.

The PC 1 is a common data processor that includes a controller 11, a storage unit 12, a communication unit 13, an operating unit 14, and a display unit 15.

The controller 11 performs overall control of each component in the PC 1. The controller 11 includes a CPU 111, a ROM 112, and a RAM 113.

The storage unit 12 is a rewritable, nonvolatile storage device. In the preferred embodiment, the storage unit 12 is configured of a hard disk drive. The storage unit 12 has various programs installed thereon, including an operating system (OS) 121, an application program 122 for executing an application such as an image-browsing program, and a printer driver 123, which is a program that allows the PC 1 to use the MFP 2.

The communication unit 13 is an interface for performing data communications with the MFP 2.

The operating unit 14 is an input device that allows the user to input instructions through external operations. In the preferred embodiment, the operating unit 14 is configured of a keyboard and a pointing device (a mouse, touchpad, or the like).

The display unit 15 is an output device for displaying various data in a visual form that the user can understand. In the preferred embodiment, the display unit 15 is configured of a liquid crystal display.

The MFP 2 is a printing device that, in addition to a printer function, includes a scanner function, color copier function, and the like. The MFP 2 includes a controller 21, a storage unit 22, a communication unit 23, an operating unit 24, a display unit 25, a scanning unit 26, and a printing unit 27.

The controller 21 performs overall control of each component in the MFP 2. The controller 21 includes a CPU 211, a ROM 212, and a RAM 213.

The storage unit 22 is a rewritable, nonvolatile storage device. In the preferred embodiment, the storage unit 22 is configured of flash memory.

The communication unit 23 is an interface for performing data communications with the PC 1.

The operating unit 24 is an input device that allows the user to input instructions through external operations. The operating unit 24 includes various operating buttons.

The display unit 25 is an output device for displaying various data in a visual form that the user can understand. A compact liquid crystal display is used as the display unit 25 in the preferred embodiment.

The scanning unit 26 functions to scan images from an original document set in a prescribed scanning position and to generate image data representing the scanned image (more specifically, image data expressed in the RGB color space).

The printing unit 27 functions to print color images by ejecting ink droplets in the colors cyan (C), magenta (M), yellow (Y), and black (K) onto paper.

2. Outline of Processes Executed on Communication System

Next, a brief description will be given of the processes executed on the communication system according to the preferred embodiment.

In the PC 1 according to the preferred embodiment, the printer driver 123 is started when a printing operation is performed in a running application. When the printer driver 123 is started, a dialog box is displayed on the display unit 15 for setting printing conditions. After the user sets printing conditions in this dialog box, the PC 1 (printer driver 123) issues a print command to the MFP 2 and transmits image data representing the target image (and specifically image data expressed in the RGB color space) to the MFP 2. The MFP 2 performs a color conversion process for converting RGB image data received from the PC 1 together with the print command to image data in the CMYK color space, whose colors correspond to the colors of ink in the MFP 2. The MFP 2 subsequently prints an image based on the converted image data (i.e., the CMYK data).

In this process, the PC 1 of the preferred embodiment prompts the user to set each value of the white point of the image being printed (hereinafter referred to as the "reference white point") and the white point corresponding to the ambient light under which the printed material will be viewed (hereinafter referred to as the "target white point"). Before transmitting the image data to the MFP 2, the PC 1 performs white balance correction on the image data so that the colors in the printed image according to the image data acquired under lighting having the color temperature of the reference white point are reproduced under lighting having the color temperature of the target white point. That is, a color appearance of the printed image according to the image data acquired under lighting having the color temperature of the reference white point is perceived as the same as a color appearance of the printed image under lighting having the color temperature of the target white point, by the user.

Figure 2:
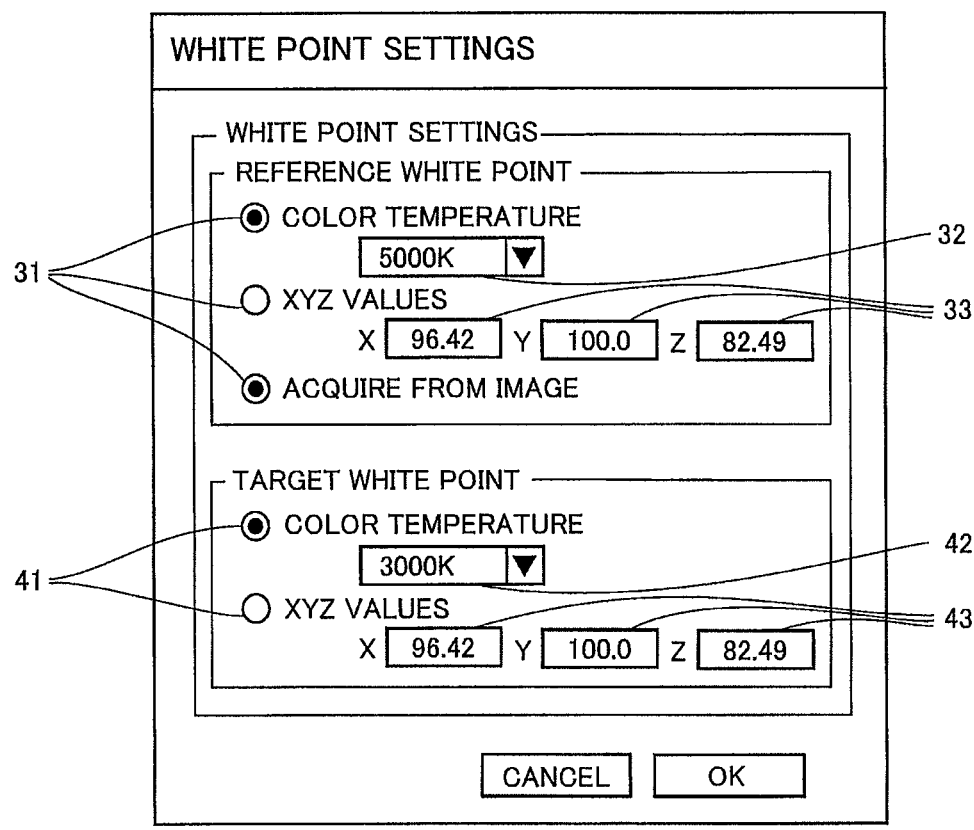
FIG. 2 is an explanatory diagram showing a dialog box of a printer driver according to an embodiment of the present invention.

Specifically, in the dialog box of the printer driver 123 shown in FIG. 2, the user can set various data indicating the reference white point and the target white point. In the example shown in FIG. 2, the dialog box includes radio buttons 31 and 41 for selecting the method of setting the reference white point and the target white point. Here, the user can choose one from among "Color temperature," "XYZ values," or "Acquire from image" as the method of setting the reference white point and from among "Color temperature" and "XYZ values" as the method of setting the target white point. When specifying the color temperature setting method, the user can then select a specific color temperature for the lighting from pull-down boxes 32 and 42, respectively. When specifying the XYZ values setting method, the user then inputs specific numbers as X, Y, and Z values in respective numerical input boxes 33 and 43. When specifying the "Acquire from image" setting method, the PC 1 automatically identifies the XYZ values of a pixel in the image represented by the image data that is brightest (i.e., the point closest to white) as the reference white point.

Thus, by prompting the user to set the reference white point and target white point in this way and subsequently performing white balance correction, the PC 1 can simulate the appearance of colors in the image for each color temperature of ambient light under which the image will be observed.

It is a particular feature of the MFP 2 according to the preferred embodiment to adjust the brightness of the printed image based on the color temperature of the target white point in order that the MFP 2 can produce a printed image according to the color temperature of the target white point that can be suitably viewed. As described above with reference to the Kruithof effect, light having a low color temperature is not pleasing at a high intensity, but is pleasing at a low intensity, while light having a high color temperature is not pleasing at a low intensity, but is pleasing at a high intensity. Accordingly, the PC 1 according to the preferred embodiment corrects image data so that the printed image is brighter as the color temperature of the target white point is higher than the color temperature of the reference white point and so that the printed image is darker when the color temperature of the target white point is lower than the color temperature of the reference white point. In other words, the PC 1 corrects image data so that the printed image is brighter or darker as the difference between the color temperature of the target white point and the color temperature of the reference white point is larger.

3. Process Executed by PC

Next, detailed steps in the process executed on the PC 1 will be described.

Figure 3:
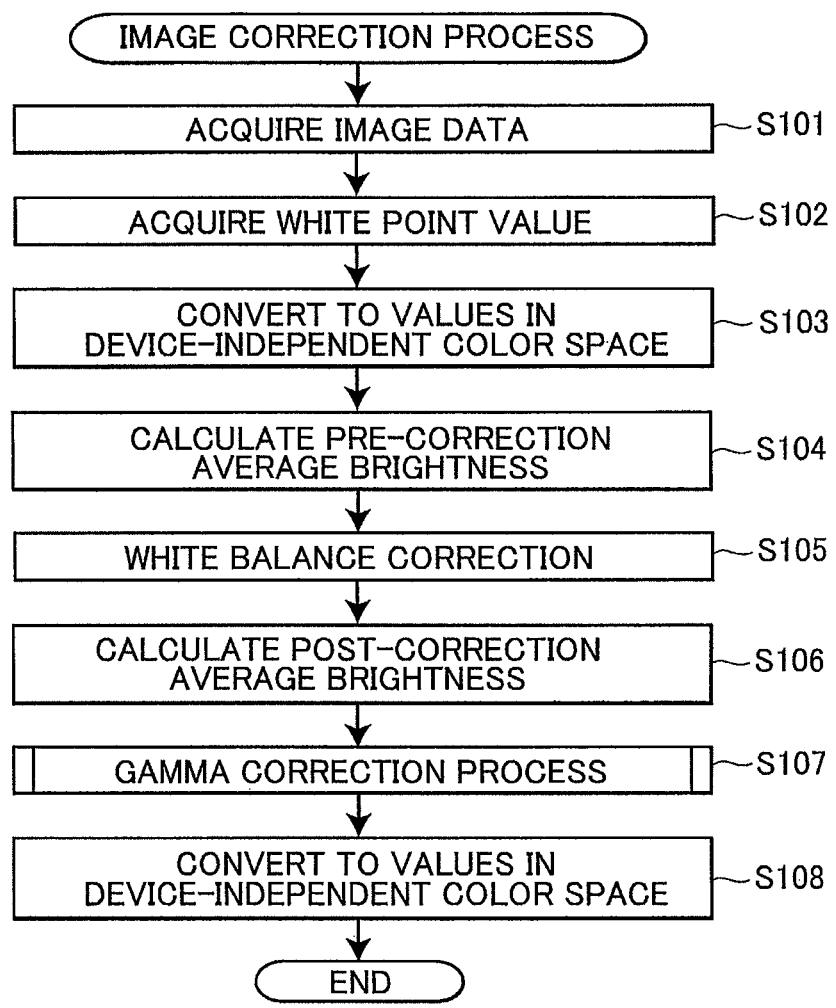
FIG. 3 is a flowchart illustrating steps in an image correction process according to an embodiment of the present invention.

FIG. 3 is a flowchart illustrating steps in an image correction process executed by the controller 11 of the PC 1 (and specifically the CPU 111) as a function of the printer driver 123 when a printing operation is performed in a running application.

In S101 at the beginning of the image correction process, the controller 11 reads image data (Ri, Gi, Bi) representing the image to be printed.

In S102 the controller 11 acquires the reference white point value (Xwi, Ywi, Zwi) and the target white point value (Xwo, Ywo, Zwo). This is the data that was previously set by the user in the dialog box of the printer driver 123 described above.

Specifically, when the user selected color temperature in the dialog box as the method of setting the white point, the controller 11 sets the white point values to the XYZ values corresponding to the color temperature selected in the pull-down boxes 32 and 42 (prestored values associated with the selectable color temperatures). If the user selected XYZ values as the method of setting the white point, the controller 11 sets the white point values to XYZ values inputted in the numerical input boxes 33 and 43. On the other hand, if the user selected "Acquire from image" as the method of setting the reference white point, the controller 11 searches for the brightest pixel in the image represented by the image data and sets the reference white point values to the XYZ values for this pixel. The XYZ values are values within the range 0-100. Before being used in the image correction process, the XYZ values are normalized to values within the range 0-1.

In S103 the controller 11 converts the image data from RGB values to values in a device-independent color space (XYZ values (Xi, Yi, Zi) in the preferred embodiment) using the device profile for the display unit 15.

In S104 the controller 11 finds a pre-correction average brightness (Yiave), which is the average value of brightness (Yi) for all pixels in the image represented by the image data.

In S105 the controller 11 performs white balance correction on the image data in order that the reference white point value of the image data approaches the target white point value. The corrected values are referred to as (Xi', Yi', Zi').

In S106 the controller 11 finds the post-correction average brightness (Yoave), which is the average value of brightness (Yi') for all pixels constituting the image represented by the image data that has undergone white balance correction in S105.

In S107 the controller 11 performs a gamma correction process on the image data based on the positional relationship between the reference white point value and the target white point value in the color space. While the gamma correction process will be described later in greater detail with reference to FIG. 4, this process serves to correct image data so that the image is brighter as the color temperature of the target white point value is higher than the color temperature of the reference white point value and darker as the color temperature of the target white point value is lower than the color temperature of the reference white point value.

In S108 the controller 11 converts the corrected image data from XYZ values to RGB values (Ro, Go, Bo), which are values in a device-dependent color space, using the device profile of the display unit 15. Subsequently, the controller 11 ends the current image correction process.

After correcting image data in the process described above, the PC 1 transfers this image data to the MFP 2. The MFP 2 performs a color conversion process on this image data using a three-dimensional look-up table (3D LUT) to convert RGB values to CMYK values and subsequently prints an image based on this image data.

Figure 4:
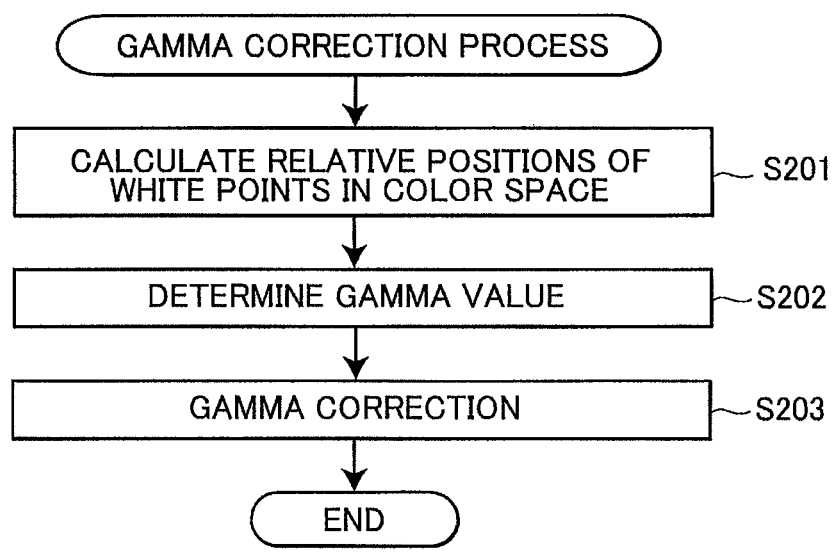
FIG. 4 is a flowchart illustrating steps in a gamma correction process according to an embodiment of the present invention.

Next, the gamma correction process in S107 of the image correction process described above will be described with reference to the flowchart in FIG. 4.

Figure 5:
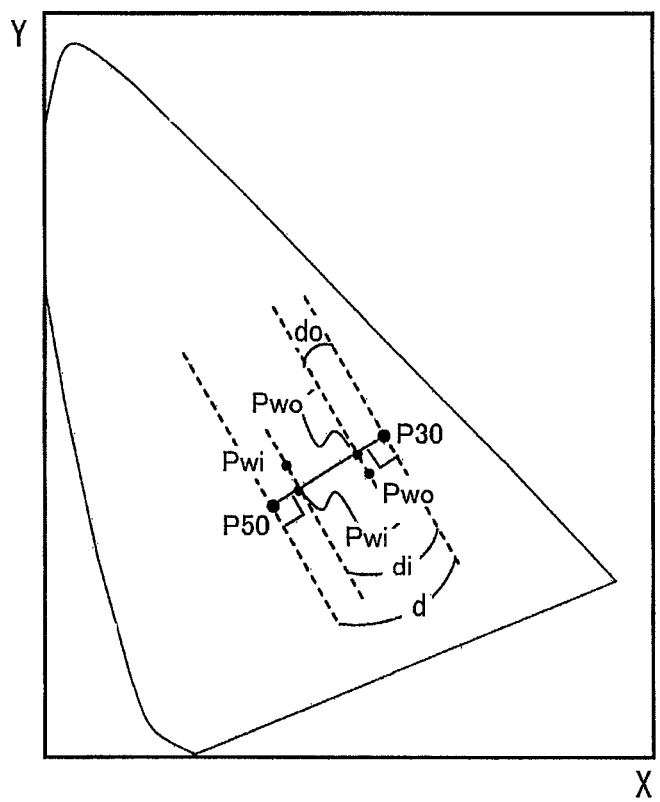
FIG. 5 is an explanatory diagram showing relative positions of reference white point value and target white point value in CIE 1931 xy chromaticity diagram.

In S201 at the beginning of the gamma correction process, the controller 11 calculates relative positions of the reference white point value (Xwi, Ywi, Zwi) and the target white point value (Xwo, Ywo, Zwo) in the CIE 1931 xy chromaticity diagram. Specifically, as illustrated in FIG. 5, the controller 11 sets points Pwi' and Pwo' by mapping a point Pwi for the reference white point value and a point Pwo for the target white point value on a line segment connecting a point P30 for light having a color temperature of 3000K to a point P50 for light having a color temperature of 5000K in the xy chromaticity diagram. In this example, the points Pwi' and Pwo' are mapped to intersections between the line segment and normals to the line segment passing through the respective points Pwi and Pwo. The points P30 and P50 are connected by a straight line (line segment) because it is presumed that a portion of the black-body radiation curve approaches a straight line.

Figure 6:
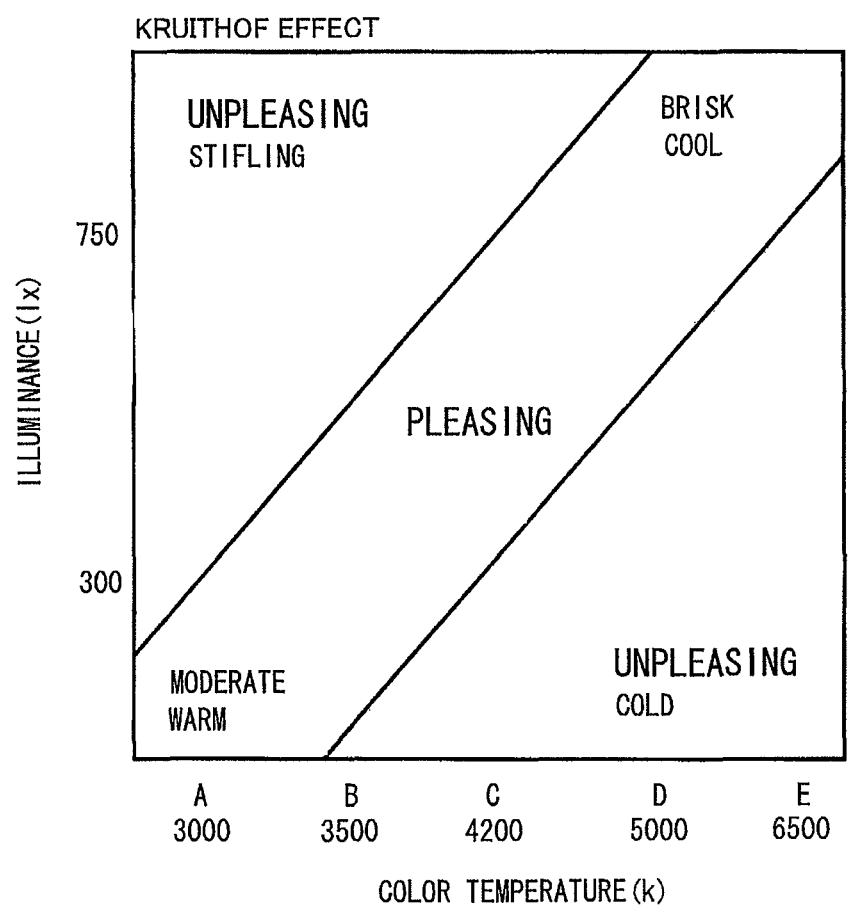
FIG. 6 is an explanatory diagram for Kruithof effect.

An optimum illuminance V(Pwi) for the reference white point value and an optimum illuminance V(Pwo) for the target white point value are found by assigning 300 lux to the optimum illuminance V(P30) in lighting having a color temperature of 3000K and assigning 750 lux to the optimum illuminance V(P50) in lighting having a color temperature of 5000K based on the Kruithof effect shown in FIG. 6. However, settings for optimum illuminance are not limited to the values in this example.

More specifically, optimum illuminances V(Pwi) and V(Pwo) can be found for the reference white point value and target white point value from Equations (1) and (2) below, where a distance d between the points P30 and P50 is normalized to 1, dt represents the distance between the points P30 and Pwi', and do represents the distance between the points P30 and Pwo'.

Equation 1

$$V(Pwi) = 300 \times (1 - di) + 750 \times di \quad (1)$$

Equation 2

$$V(P_{wo}) = 300 \times (1-d_o) + 750 \times d_o \quad (2)$$

Hence, Equations (1) and (2) simplify the Kruithof effect for the color temperature of commonly used ambient lighting. By finding interpolation values for points Pwi' and Pwo', it is possible to find the illuminances V(Pwi) and V(Pwo) that approach optimum illuminances for points Pwi and Pwo. Here, it is reasonable to find the illuminances V(Pwi) and V(Pwo) that approach optimum illuminances since the boundary between pleasing and unpleasing light according to the Kruithof effect is somewhat vague.

Next, in S202 the controller 11 finds a gamma value y to be used in the gamma correction process of S203 from Equations (3) and (4) below based on the illuminances V(Pwi) and V(Pwo) calculated in S201. Equation (3) is found from Equation (5), which signifies that the integral after gamma correction divided by the integral before gamma correction equals the optimum illuminance at Pwo divided by the optimum illuminance at Pwi. In other words, the controller 11 calculates a gamma value γ' for changing the brightness of the printed image based on the ratio between the optimum illuminance for the color temperature of the reference white point value and the optimum illuminance for the color temperature of the target white point value. Further, the controller 11 calculates the gamma value y by using the gamma value γ' in the same manner as a method for calculating the gamma value γ'.

Equation 3

$$\gamma' = \frac{V(P_{wo})}{2 \times V(P_{wi}) - V(P_{wo})} \quad (3)$$

Equation 4

$$\gamma = \frac{(Y_{iave})^{\frac{1}{\gamma'}}}{2 \times Y_{oave} - (Y_{iave})^{\frac{1}{\gamma'}}} \quad (4)$$

Equation 5

$$\frac{1 / \frac{1}{\gamma'} + 1}{1/2} = \frac{V(P_{wo})}{V(P_{wi})} \quad (5)$$

In S203 the controller 11 performs gamma correction on the image data (Xi', Yi', Zi') using the gamma value y calculated in S202 to obtain corrected image data (Xo, Yo, Zo). Subsequently, the controller 21 ends the current gammma correction process.

By performing gamma correction in this way, the controller 11 can correct brightness in the image data to a greater brightness as the color temperature of the target white point value is higher than the color temperature of the reference white point value and to a lesser brightness as the color temperature of the target white point is lower than the color temperature of the reference white point value (Equation (3)). The controller 11 can perform additional correction on the image data through fine adjustments to reduce the brightness of the image as the post-correction average brightness (Yoave) is higher than an estimated value $((Y_{iave})^{1/\gamma'})$ that is a value acquired by correcting the pre-correction average brightness (Yiave) using the gamma value γ' and to increase the brightness of the image as the post-correction average brightness (Yoave) is lower than the estimated value $((Y_{iave})^{1/\gamma'})$ (Equation (4)). Here, the "estimated value" is the average value thought to be desirable at the target white point.

4. Effects of the Embodiment

As described above, the PC 1 according to the preferred embodiment identifies the reference white point value as the white point of an image expressed by image data (S102) and corrects the white balance of the image data so that the reference white point approaches the target white point (S105). The PC 1 also performs gamma correction on the image data that has already undergone white balance correction in order that the image is brighter as the color temperature of the target white point is greater than the color temperature of the reference white point and the image is darker as the color temperature of the target white point is lower than the color temperature of the reference white point (S107).

Hence, the PC 1 according to the preferred embodiment does not simply perform the conventional white balance correction to adjust the reference white point of the image closer to the target white point, but also adjusts the image after white balance correction to a suitable brightness based on the Kruithof effect.

Further, the PC 1 according to the preferred embodiment can automatically and accurately identify the reference white point value of image data by finding the brightest pixel in the image represented by the image data.

Further, since the user is allowed to set the target white point on the PC 1 (S102), the target white point after white balance correction is not a fixed value but may be adjusted to an arbitrary white point. Accordingly, the target value of the corrected white point (target white point) can be adjusted to a value conforming to the user's preference or the application through simulations of the color appearance at various color temperatures for ambient lighting under which the image will be observed.

The PC 1 of the preferred embodiment also calculates the pre-correction average brightness indicating the average value of brightness in an image before white balance correction, and the post-correction average brightness indicating the average value of brightness in the image after white balance correction (S104, S106). Subsequently, the PC 1 corrects the image data to reduce brightness in the image as the post-correction average brightness is greater than the estimated value that is a value acquired by correcting the pre-correction average brightness and to increase the brightness in the image as the post-correction average brightness is lower as the estimated value (S107).

Therefore, the PC 1 according to the preferred embodiment can produce an image with a more suitable brightness than when uniformly correcting the brightness of the image without regard for differences in the overall brightness of the image.

6. Variations of the Embodiment

While the invention has been described in detail with reference to specific embodiments thereof, it would be apparent to those skilled in the art that many modifications and variations may be made therein without departing from the spirit of the invention, the scope of which is defined by the attached claims.

6-1. Image Data

In the preferred embodiment described above, the image data representing the image to be printed that is transmitted to the MFP 2 is expressed in the RGB color space. However, the image data may be expressed in another color space. For example, the printer driver 123 of the PC 1 may perform a color conversion process on the image data to convert the RGB data to CMYK data, and the PC 1 may transmit the image data expressed in the CMYK color space to the MFP 2.

6-2. White Point Values

In the preferred embodiment described above, the user is prompted to set the target white point as a color temperature or as XYZ values. However, the user may also be allowed to select a type of lighting, for example, such as fluorescent lighting, incandescent lighting, and the like. Such a selection method may be more user-friendly than setting the color temperature.

6-3. Image Processor

In the preferred embodiment described above, the PC 1 serves as an example of the image processor according to the present invention. However, the MFP 2 in the preferred embodiment may also function as the image processor of the present invention. Specifically, the MFP 2 may receive pre-corrected image data from the PC 1 and print an image based on the image data after performing the processes in S101-S108. The MFP 2 may also perform the settings for the reference white point and the target white point so that the process in S101-S108 can be performed on the MFP 2 without the MFP 2 being connected to the PC 1. Further, the image processor is not limited to a MFP, but may also be a printing device having no scanner function or the like.

What is claimed is:

1. An image processor comprising:
   an identifying unit that identifies an identified white point value of an image represented by first image data, the identified white point value indicating a first color temperature;
   a target obtaining unit that obtains a target white point value indicating a second color temperature;
   a first correcting unit that performs a white balance correction on the first image data such that the identified white point value approaches the target white point value; and
   a second correcting unit that performs a brightness correction in which the first image data corrected by the first correcting unit is corrected to become second image data, such that:
      an image corresponding to the second image data becomes brighter than the image represented by the first image data by performing the brightness correction, in addition to the white balance correction by the first correcting unit, in response to the second color temperature of the target white point value of the second image data, which is the first image data corrected by the first correcting unit and the second correcting unit, being greater than the first color temperature of the identified white point value of the first image data before the white balance correction and the brightness correction; and
      the image corresponding to the second image data becomes darker than the image represented by the first image data by performing the brightness correction, in addition to the white balance correction by the first correcting unit, in response to the second color temperature of the target white point value of the second image data, which is the first image data corrected by the first correcting unit and the second correcting unit, being less than the first color temperature of the identified white point value of the first image data before the white balance correction and the brightness correction.

2. The image processor according to claim 1, wherein the identifying unit identifies, as the identified white point value, a value of a pixel that is brightest in the image represented by the image data.

3. The image processor according to claim 1, wherein the target obtaining unit comprises an input unit through which the target white point value is configured to be input.

4. The image processor according to claim 1, further comprising:
   a first calculation unit that calculates a first average brightness which is an average value of brightness for all pixels in the image represented by the first image data; and
   a second calculation unit that calculates a second average brightness which is an average value of brightness for all pixels in the image represented by the first image data that has undergone the white balance correction by the first correcting unit,
   wherein the second correcting unit calculates a correction parameter used for the brightness correction and corrects the first average brightness using the correction parameter, the second correcting unit correcting the first image data corrected by the first correcting unit to become the second image data such that the image corresponding to the second image data is darker than the image represented by the first image data when the second average brightness is greater than the corrected first average brightness and the image corresponding to the second image data is brighter than the image represented by the first image data when the second average brightness is less than the corrected first average brightness.

5. A non-transitory computer-readable medium storing a computer-executable image-processing program executable on an image-processor, the image-processing program comprising:
   instructions for identifying an identified white point value of an image represented by first image data, the identified white point value indicating a first color temperature;
   instructions for obtaining a target white point value indicating a second color temperature;
   instructions for performing a white balance correction on the first image data such that the identified white point value approaches the target white point value; and
   instructions for performing a brightness correction in which the first image data corrected through the white balance correction is corrected to become second image data, such that:
      an image corresponding to the second image data becomes brighter than the image represented by the first image data by performing the brightness correction, in addition to the white balance correction, in response to the second color temperature of the target white point value of the second image data, which is the first image data corrected through the white balance correction and the brightness correction, being greater than the first color temperature of the identified white point value of the first image data before the white balance correction and the brightness correction; and
      the image corresponding to the second image data becomes darker than the image represented by the first image data by performing the brightness correction, in addition to the white balance correction, in response to the second color temperature of the target white point value of the second image data, which is the first image data corrected through the white balance correction and the brightness correction, being less than the first color temperature of the identified white point value of the first image data before the white balance correction and the brightness correction.

6. An image-processing method comprising:
identifying an identified white point value of an image represented by first image data, the identified white point value indicating a first color temperature;
obtaining a target white point value indicating a second color temperature;
performing a white balance correction on the first image data such that the identified white point value approaches the target white point value; and
performing a brightness correction in which the first image data corrected through the white balance correction is corrected to become second image data, such that:
  an image corresponding to the second image data becomes brighter than the image represented by the first image data by performing the brightness correction, in addition to the white balance correction, in response to the second color temperature of the target white point value of the second image data, which is the first image data corrected through the white balance correction and the brightness correction, being greater than the first color temperature of the identified white point value of the first image data before the white balance correction and the brightness correction; and
  the image corresponding to the second image data becomes darker than the image represented by the first image data by performing the brightness correction, in addition to the white balance correction, in response to the second color temperature of the target white point value of the second image data, which is the first image data corrected through the white balance correction and the brightness correction, being less than the first color temperature of the identified white point value of the first image data before the white balance correction and the brightness correction.

* * * * *